United States Patent [19]
Bauknecht et al.

[11] 3,820,082
[45] June 25, 1974

[54] DATA STORAGE MEANS FOR ELECTRICAL CONTROL SYSTEMS PARTICULARLY FOR KNITTING MACHINES

[75] Inventors: Gunter Bauknecht, Eningen; Wilhelm Hadam; Jurgen Ploppa, both of Reutlingen, all of Germany

[73] Assignee: H. Stoll Company, Reutlingen, Postfach, Germany

[22] Filed: Dec. 4, 1972

[21] Appl. No.: 311,530

[30] Foreign Application Priority Data
Dec. 3, 1971 Germany.......................... 2159992

[52] U.S. Cl. ............................................ 340/172.5
[51] Int. Cl. ............................................. G06f 13/00
[58] Field of Search .................. 340/172.5, 173 RC

[56] References Cited
UNITED STATES PATENTS
3,341,819   9/1967   Emerson......................... 340/172.5
3,648,254   3/1972   Beausoleil....................... 340/172.5
3,701,988   10/1972  Allaart........................... 340/172.5 X Primary Examiner—Raulfe B. Zache
Attorney, Agent, or Firm—Larson, Taylor & Hinds

[57] ABSTRACT

A data storage means for an electrical control system such as is used with a textile, e.g. knitting, machine which produces webs of material, is provided which comprises a plurality of modules each forming a part memory, the modules, each of which includes a memory in the form of a rotary shift register, being selectively combinable to form a whole or complete memory of a desired capacity. The individual modules are detachably received in, e.g., inserted in, a carrier which includes data input(s), a data output and control input(s). The modules further include an intermediate storage device (memory) connected to the rotary shift register through a read-out device.

7 Claims, 2 Drawing Figures

DATA STORAGE MEANS FOR ELECTRICAL CONTROL SYSTEMS PARTICULARLY FOR KNITTING MACHINES

FIELD OF THE INVENTION

The present invention relates to a data storage means for an electrical control system, and, more particularly, for systems for controlling textile machines which produce webs of material.

BACKGROUND OF THE INVENTION

The predominant practice in hitherto-known electrical control systems for the machines referred to above, and, more particularly, for knitting machines, is to store the control program and the program data therefor on movable data storage means such as, for example, film strips, magnetic tape, or punched strips. In the case of control systems in which different program data must be simultaneously available, problems arise in relation to providing space in which to accomodate these movable data storage means. Unfortunately, these problems can only be met by the use of more expensive and demanding program carriers and/or associated reader devices.

Further disadvantages of movable program carriers of this kind result from the facts that (1) the expected life is very limited when the carriers are exposed to continuous operation, and (2) the carriers, and the devices for monitoring the same, are subject to damage or spoilage where, for example, the carriers are used in control systems for textile machines. For example, such spoilage can be caused by fine dust particles and even by merely rubbing on the tapes or strips. Spoilage of this nature can, of course, very readily cause errors in the controls provided and, for example, may result in pattern errors in a knitted fabric.

SUMMARY OF THE INVENTION

In accordance with the present invention, a data storage means is provided for electrical control systems which is economical to manufacture, which provides a storage capacity that can be enlarged at will in accordance with predetermined requirements, and which can operate without the need of a continuously movable mechanical program carrier.

According to the invention, a data storage means is provided which comprises a plurality of like modules each forming a part memory, the modules each including at least one memory in the form of a rotary shift register, and the modules being selectively combined together to form a "whole" memory of a desired capacity.

Advantageously, the modules are such that any desired number and arrangement thereof can be detachably secured to a carrier. For example, the modules may be insertible in the carrier, the latter having, at each insertion point, terminals for at least one data input, a data output and at least one control input. Each module is provided with an intermediate memory which is connected to the rotary shift registers through a read out device. This read out device, which is also included in the module, may be controlled from outside the latter, i.e., may be externally controlled. A piece of information can be read out from the continuously rotating shift register into this intermediate memory and stored therein until called for by the incidence of a next succeeding piece of read-out information. As a consequence, the modules, operating with their registers rotating at high speed and acting as part memories, assume the character of a statistical memory.

In a preferred embodiment, the read-out device of the modules comprises a synchronizing counter which is connected to the rotary shift register and operates at the same speed. The output of the synchronizing counter is connected to a comparator stage to which, in turn, is connected an externally operable address counter. Should a specific enquiry signal be made externally to the address counter, the information corresponding to this enquiry is delivered from the shift register memory at the output of the comparator stage as soon as the synchronizing counter indicates or signals that the corresponding information point has been reached during the rotation or cyclying of the shift register. The information read out is then put into the intermediate memory, and is re-entered in this intermediate memory anew during the next cycle or rotation of the shift register as long as the enquiry signal persists at the address counter. This arrangement provides a very firm guarantee the information will be available for retrieval when enquiries are made of the memory. The output of the intermediate memory is controlled through a switching stage which is likewise externally controlled and through which the information is retrieved from the intermediate memory. The modules of the data storage means are particularly adapted to be implemented by integrated circuit techniques and hence the data storage means of the invention has the advantage that a large number of storage points can be provided, with very small demands on space, using such integrated modules. Further, these modules can be broken up into a plurality of synchronously rotating parallel registers so as to reduce the speed of rotation of the shift register. These parallel registers are preferably coupled to one another at both the input side and the output side through suitable logical circuits. By virtue of the construction of the read-out devices of the modules, a timing pulse generator or clock common to all modules can be employed. Each address counter is separately provided for each part memory.

As alluded to above, the data storage means of the invention affords an almost limitless storage capacity, the number of units available easily exceeding the million mark in an exemplary embodiment. In this regard, each module itself can include up to a thousand or more storage units. Further, the demand on space is quite small and the expense thereof low because of the integrated form of the individual modules and because these individual modules are interchangeable. In view of the very high storage capacity thereof, the data memories of the invention are particularly suited to the control of textile machines which produce webs of material, e.g. weaving machines and knitting machines. In the case of flat knitting machines, for example, a single module can be used in the control mechanism and can be used to store the information required for each needle of the needle bed, thus serving a function analogous to the jacquard card presently provided in mechanical control systems. Hence, a single module can be used to permanently keep all of the control information necessary for the formation of a complete course of stitches. Such an approach provides the advantage to the knitting machine user that he will be able to enlarge the data storage capacity of the control mechanism as much as desired. Accordingly, as applied to knitting machines, the invention can be used for the production of fabrics with either relatively simple patterns using only a few modules, or more complicated patterns using further, similar, and interchangeable modules to provide additional information.

The required data items are stored in the modules by a single read-in process form a selected data carrier, such as a magnetic tape or punched strip, at a speed which conforms to that of the carrier. This data is then held in the module until an interrogatory voltage is applied to the module memory. The aforementioned single data carrier enables, during a single run through or rotation thereof or during a plurality of successive rotations, the supplying of a multiplicity of individual machines each having its own data storage means in accordance with the invention. A great advantage of this approach is that the overall program of a machine can be fed into the data storage means. In a knitting machine, therefore, not only is the information controlling a single row of stitches held in the storage means, but new information can be continuously furnished as well. It is also noted that when the data storage means is in use, a user is not bound to interrogate a specific sequence of stored information but rather can enquire from module to module of the memory, as required, and the information will be sent through the address counter from one contained individual item of information to any other such item. This address counter, will, for example, in the case of a control arrangement for a knitting machine, run synchronously with the needle steps of the machine. The total information contained in the rotating shift register of the module can also be read out through the address counter in the sequence of space of the stored individual pieces of information, but with a selected starting point of the sequence; moreover, the stored sections of information, or a part of these sections, can be repeated in the same sections or in mirror image fashion.

In view of the capability provided of enlarging the storage capacity of the data storage means of the invention to any desired amount, the module carrier can advantageously be sub-divided into a number of subsections which can be juxtaposed one to another as required. Moreover, a number of modules can be combined with one another to form module groups and these groups may take the form of integrated circuits so as to reduce the cost of production. A further advantage of the data storage means according to the invention lies in the fact that the speed of rotation thereof, and, therefore, the power consumption demands thereof, can be varied as desired. Thus, for example, if the data storage means are at rest, i.e., the machine associated with the control system is switched off, the speed of rotation of the shift registers of the modules can greatly be reduced without the stored information being varied as a consequence.

Other features and advantages of the invention will be set forth in or apparent from the detailed description of a preferred embodiment found herein below.

DETAILED DESCRIPTION OF A PREFERRED EMBODIMENT

Figure 1:
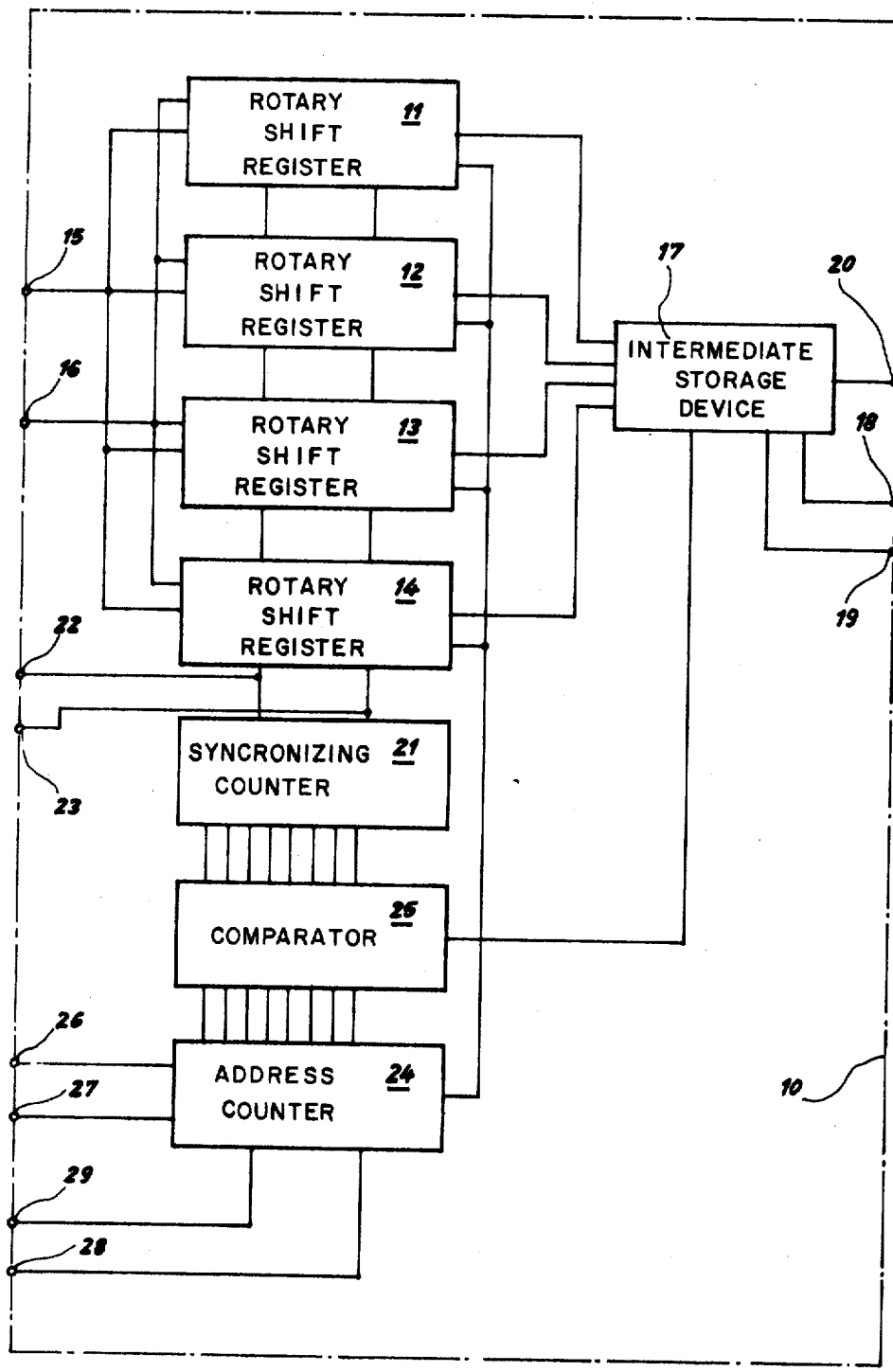
FIG. 1 is a schematic circuit diagram, in block form, of a single module of the data storage means of the invention.

Referring to FIG. 1, a module of the data storage means of the invention is shown within the chain line block denoted 10. The module 10 includes as the dynamic storage portion comprising four shift registers 11, 12, 13, 14 connected in parallel as shown. A multiplex operation is used to input information to, and retrieve information from, the module 10 and the four parallel shift registers 11 to 14 are mutually interconnected through suitable logic circuits (not shown).

The rotary shift registers 11 to 14 are connected through the logic circuits mentioned above to a common data input line 15, and to a control signal input line 16 to which control or switching signals are applied. The outputs of the four parallel-connected shift registers 11 to 14, are coupled to an intermediate memory or storage unit 17 which includes a bistable or flip-flop switching circuit. The intermediate memory 17 controls enabling or blocking the data output, denoted 20, of the module 10 in accordance with control signals from first and second control signal inputs 18 and 19.

The four parallel-connected shift registers 11 to 14 are also connected to synchronizing counter 21, both the registers 11 to 14 and the counter 21 being fed with clock or timing signals through external connections 22 and 23 of the module 10. The synchronizing counter 21, together with an address counter 24 and a comparator stage 25, constitute a read-out device for the module 10. The address counter 24 receives timing pulses through a pair of connections 26 and 27 from the machine (not shown) which is to be controlled or from a program carrier (not shown) from which the information data to be stored in the shift registers 11 to 14 is extracted. All addresses for the reading-in and reading-out of stored information are produced in the latter. The address counter 24 can be set to a higher or a lower starting value by control signals applied to first and second control inputs 28 and 29. The comparator stage 25, which is connected to both the inputs of the synchronizing counter 21 and the outputs of the address counter 24, compares the contents of the synchronizing and address counters 21 and 24. When the contents are the same, the information from the addressed information memory point is transmitted from the rotary shift registers to the intermediate storage unit 17. Because the address counter 24, which receives clock pulses during the read-out operation from the machine which is to be controlled, usually operates very slowly, the address information is passed several times through comparator stage 25 in the intermediate storage unit 17. Thus, should the address information not immediately be correctly taken at the beginning of a counting impulse because of interference, such as might be caused by different operating periods of different part circuits, this fault will be removed immediately and automatically by the following addressing operation. This greatly assists the accuracy of operation of the data storage means.

Figure 2:
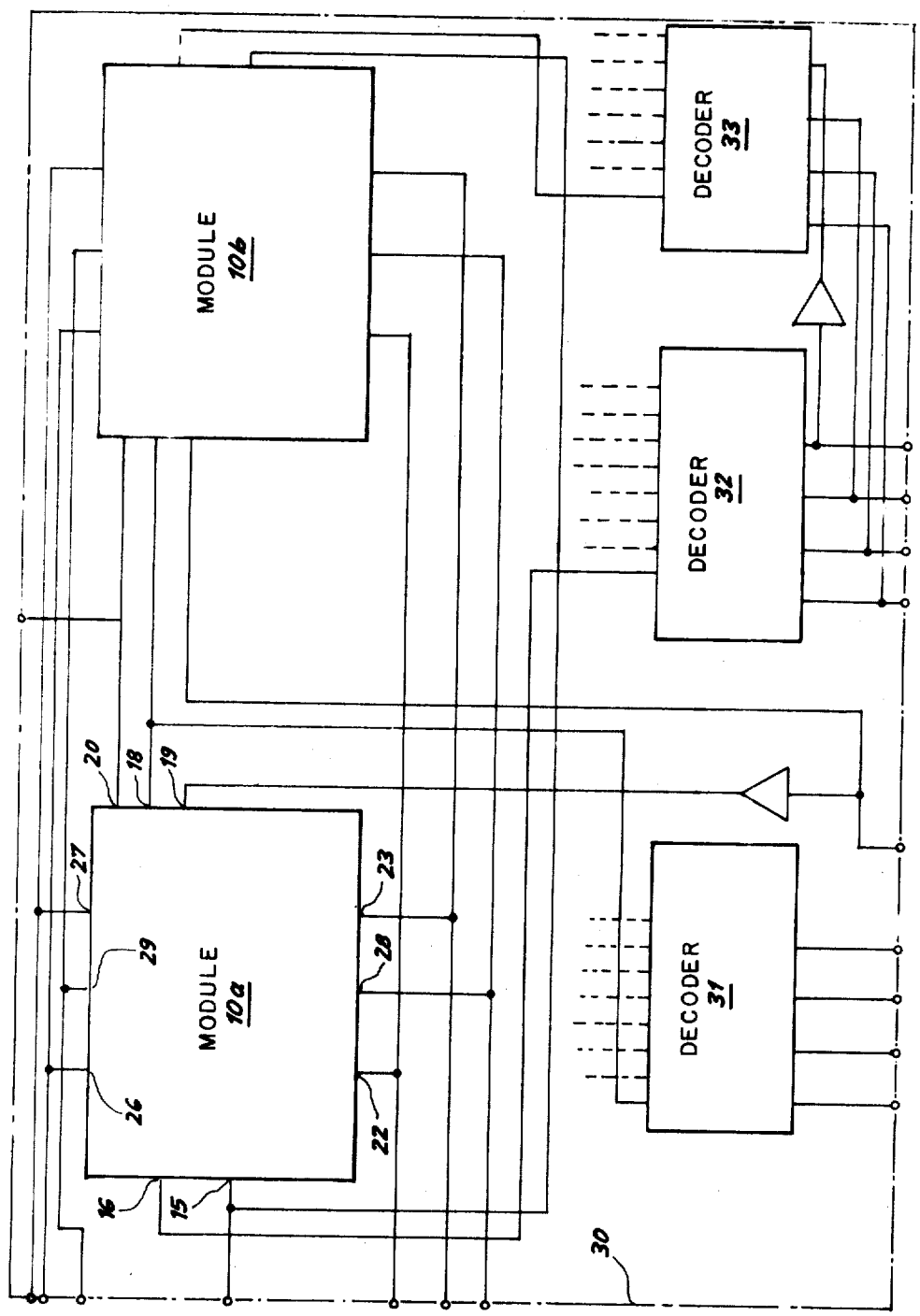
FIG. 2 is a schematic block diagram of a portion of a carrier for the insertion of modules such as those shown in FIG. 1.

Referring to FIG. 2, a portion of a carrier for the data storage means is shown. The carrier, denoted 30, is designed to receive a plurality of the modules 10 of FIG. 1, the modules being preferably inserted therein. Two exemplary modules denoted 10a and 10b are illustrated in FIG. 2 and occupy the first insertion points of each of two rows of such points on the carrier 30. The insertion points for modules 10 are designated with correspondingly lettered contact points in FIG. 2 and, as is apparent from FIG. 2, all of the similarly lettered contact points of all the insertion points are interconnected to correspondingly designated common communication points at the periphery of the carrier.

The carrier 30 also includes a plurality of decoders 31, 32 and 33 with which a group of modules, or module-insertion points, are associated. The decoders 31 to 33 constitute a part of the so-called marginal electronics of the data storage means such as is required for the module selection during a read-out operation from storage as well as during the actual storage of the information. Decoders 31 to 33 also provide blocking of specific terminals of the modules to increase operational accuracy.

The information can be read into the rotary shift registers 11 to 14 of the modules 10 from a punched strip, the speed of travel of which is synchronized with the address counter 24. A "signal record" is provided at the control input 16 of module 10. The address counter 24 counts in a predetermined direction and as soon as control signals appear at the two input terminals 18 and 19 of the output switching stage 17, the latter is immediately switched over from record to shift register rotation, so that information can be accepted.

Although the invention has been described relative to an exemplary embodiment, it will be understood by those skilled in the art that variations and modifications can be effected in this embodiment without departing from the scope and spirit of the invention.

We claim:

1. Data storage means for an electrical control system such as used with a textile machine which produces webs of material, said data storage means comprising a plurality of like modules each forming a part memory, said modules each including at least one memory comprising a rotary shift register, an externally controllable read-out device and an intermediate storage device connected to said rotary shift register, said read-out device including a synchronizing counter connected to said rotary shift register, an externally controllable address counter and a comparator means having first and second inputs respectively connected to the outputs of said synchronizing counter and said address counter and an output connected to said intermediate storage device, and said modules being selectively combined together to form a whole memory of a desired capacity.

2. Data storage means as claimed in claim 1 wherein said synchronizing counter counts at a rate equal to the shift rate of said rotary shift register and said address counter counts at a rate which is a function of an operating rate of the textile machine.

3. Data storage means as claimed in claim 1, further comprising a carrier for detachably receiving a desired number of said modules to form a whole memory of a desired capacity, said carrier comprising at least one data input, a data output and at least one control input.

4. Data storage means as claimed in claim 3, wherein each said carrier is divided into a plurality of carrier sections adjoined to one another, and said modules are combined to form groups of modules.

5. Data storage means as claimed in claim 1, wherein each said rotary shift register comprises a plurality synchronously rotating, parallel connected shift registers.

6. Data storage means as claimed in claim 1, wherein each said module includes switching means connected to at least one control terminal of the said module, for controlling the output of said intermediate storage device.

7. Data storage means as claimed in claim 1, for an electrical needle selector arrangement of a knitting machine, the said rotary shift registers of each said module including a number of stages corresponding at least to the total number of knitting needles contained in a needle carrier of the knitting machine.

* * * * *